United States Patent
Mayer et al.

[11] Patent Number: 6,109,750
[45] Date of Patent: Aug. 29, 2000

[54] METHOD FOR THREE-DIMENSIONAL IMAGING REPRESENTATION ON A LARGE-SCREEN PROJECTION SURFACE USING A LASER PROJECTOR

[75] Inventors: Christoph Mayer, Augsburg; Klaus Lockmann, Delbrück, both of Germany

[73] Assignee: Siemens Nixdorf Informationssysteme Aktiengesellschaft, Paderborn, Germany

[21] Appl. No.: 09/202,444

[22] PCT Filed: Jun. 19, 1997

[86] PCT No.: PCT/DE97/01286

§ 371 Date: Dec. 14, 1998

§ 102(e) Date: Dec. 14, 1998

[87] PCT Pub. No.: WO98/00748

PCT Pub. Date: Jan. 8, 1998

[30] Foreign Application Priority Data

Jun. 28, 1996 [DE] Germany ............................ 196 26 096

[51] Int. Cl.[7] .................................................. G03B 21/00
[52] U.S. Cl. ..................................... 353/7; 353/8; 353/82; 349/15; 359/216; 359/221
[58] Field of Search .......................... 349/8, 15; 345/139; 348/57, 58; 359/216, 217, 221, 250, 465; 353/7, 8, 82; 355/47

[56] References Cited

U.S. PATENT DOCUMENTS

| | | | |
|---|---|---|---|
| 4,952,956 | 8/1990 | Kikuchi | 354/224 |
| 5,485,225 | 1/1996 | Deter et al. | |
| 5,903,304 | 5/1999 | Deter | 348/57 |

FOREIGN PATENT DOCUMENTS

| | | |
|---|---|---|
| 0 211 596 | 2/1987 | European Pat. Off. |
| 32 143 27 | 10/1983 | Germany . |
| 41 25 241 | 1/1993 | Germany . |

OTHER PUBLICATIONS

Patent Abstracts of Japan—Jun. 10, 1984—59176720.
Fernsehrevolution Durch Die Laser–Display–Technologie.
Die Laser–Display–Technik—Funkschau.

*Primary Examiner*—David M. Gray
*Assistant Examiner*—E P LeRoux
*Attorney, Agent, or Firm*—Hill & Simpson

[57] ABSTRACT

For three-dimensional image representation on a large-screen projection surface by means of a multimode or, respectively, monomode laser projector, in the first case it is proposed to direct the multimode laser beam onto a polygonal mirror with layers that alternatively polarize light in two different directions, from which lines of the one direction of polarization and lines of the other direction of polarization and lines of the other direction of polarization are then plotted on the large-screen projection surface in alternating fashion. In the second case, the monomade laser beam is directed by a partially transparent mirror and only then onto the polygonal mirror. A partial beam derived from the partially transparent mirror is rotated in its direction of polarization and directed onto the polygonal mirror from another direction. The polygonal mirror alternately directs the one and the other incoming beam onto the larhe-screen projection surface, and thus alternatively plots lines of the one and lines of the other direction of polarization on the large-screen projection surface. Respective images are allocated to the lines of the one and to the lines of the other direction of polarization, which images can be seen three-dimensionally using 3D glasses.

6 Claims, 2 Drawing Sheets

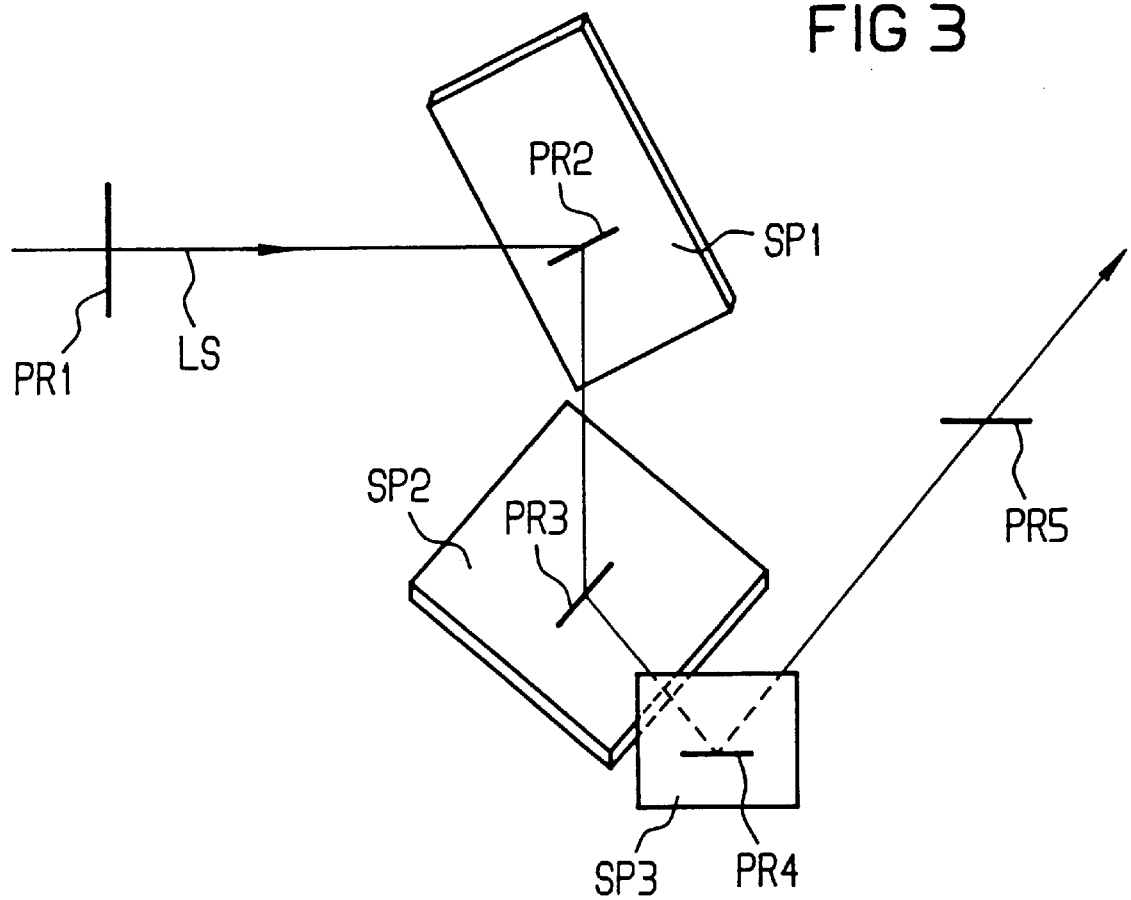

METHOD FOR THREE-DIMENSIONAL IMAGING REPRESENTATION ON A LARGE-SCREEN PROJECTION SURFACE USING A LASER PROJECTOR

BACKGROUND OF THE INVENTION

The invention relates to methods for three-dimensional image representation on a large-screen projection surface using a laser projector.

There are various embodiments of television projectors that can project an image onto a large-screen projection surface. One of these concerns laser projectors. A laser projector can be used for a two-dimensional representation of graphics, etc. For example, in a color laser projector light of the colors red, green and blue is produced by three lasers. The light beams are deflected horizontally by a rotating polygonal mirror. The horizontal deflection permits the representation of a display screen line. After the horizontal deflection, a vertical deflection takes place by means of a further rotating mirror. In this way, the image is projected on a large-screen projection surface via an optical unit. A laser projector thus enables the representation of very large images with particularly brilliant colors.

A color laser projector comprises three lasers for the colors red, green and blue, but the laser design is the same for all three colors. For an individual image point on the large-screen projection surface, the different colors are merely superimposed on one another for a correspondingly required overall color.

Among laser projectors, there are two different basic types. One type operates with multimode lasers and the other type operates with monomode lasers. The laser beams produced by monomode lasers comprise a single direction of polarization.

They have a light polarized in linear fashion. In contrast, the laser beams produced by multimode lasers have circularly polarized light; i.e., they have more than just one direction of polarization. For example, they have 2, 4, etc., different directions of polarization. In the extreme case, their polarizations scatter in all directions.

The principle of laser display technique is described in the German publication Funkschau, 1995, no. 18, pp. 104–107, under the column Technik and the title "Die Laser-Display-Technik," and in a sales brochure, published at the CeBIT 1995, of the company Laser Display Technologie GmbH & Co. KG, Carl-Zeiss-Str. 2, 07552 Gera. In addition, from the German laid open publication DE 32 14 327 Al it is known to occupy a display screen in line-by-line exchange with polarization film strips of alternating directions of polarization, so that a stereo field can be reproduced per television field.

From the references EP-A-0 211 596 and JP-A-59/176 720, methods are known for large-screen projectors with which three-dimensional images can be represented. Polygonal mirrors are thereby used on whose mirror parts a laser beam impinges in frontal fashion.

From the reference DE-A-41 25 241, a method for large-screen projectors is likewise known with which three-dimensional images can be represented. In this method, a polygonal mirror is not used.

SUMMARY OF THE INVENTION

An object of the invention is to indicate methods for three-dimensional image representation on a large-screen display surface by means of the functional principle of a laser projector.

According to the present invention, a method is provided for three-dimensional image representation on a large-screen projection surface by use of a functional principle by a laser projector having a rotating polygonal mirror for line deflection, and having at least one laser that emits a multimode laser beam. The multimode laser beam is directed from the side onto mirror parts of the polygonal mirror which respectively polarize light in first and second different directions in alternating fashion, are arranged in the manner of blades of a propellor, and respectively comprise an angle of incidence from which corresponding to the respectively alternating light-polarizing mirror parts set at an angle, lines are plotted on the large-screen projection surface with the direction of polarization and with the second direction of polarization in respective alternating fashion. The multimode laser beam is controlled such that on the large-screen projection surface a first image is respectively produced with only lines of the first direction of polarization and a second image is produced with only lines of the second direction of polarization, and the first and second images having respective characteristics such that they can be combined to form the three-dimensional overall image by an observer with a pair of glasses having a first glass for the first direction of polarization and having a second glass for the second direction of polarization.

According to this, with the use of the multimode laser principle, the multimode laser beam is cast onto two light-polarizing mirror parts of the polygonal mirror that respectively polarize light in two different directions in alternating fashion. From the mirror parts of the polygonal mirror, lines are plotted in respectively alternating fashion with the one and with the other direction of polarization, corresponding to the respectively alternating light-polarizing mirror parts. In addition, the controlling of the multimode laser beam is executed in such a way that a first image, with only the lines of the one direction of polarization, and a second image, with only the lines of the other direction of polarization, respectively arising on the large-screen projection surface. The two respective images thereby have the characteristic that they can be combined to form a three-dimensional overall image by an observer with a pair of glasses having a first glass for the one direction of polarization and having a second glass for the other direction of polarization.

With the application of the monomode laser principle, before impingement the monomode laser beam is deflected, using a partially transparent mirror, from a first direction onto respective associated first mirror parts of the polygonal mirror, which provide a deflection onto respective first lines of respectively successive first and second lines of the large-screen projection surface. The partially transparent mirror serves for the deflection of a partial beam of the monomode laser beam. After the partially transparent mirror, or, after the deflection of a partial beam of the monomode laser beam, either the deflected partial beam or the non-deflected monomode laser beam is optionally rotated in its direction of polarization. The deflected and, if warranted, rotated partial beam is directed from a second direction (in relation to the first direction) onto respective associated second mirror parts of the polygonal mirror for a deflection onto the respective second lines of the respectively successive first and second lines of the large-screen projection surface. The controlling of the monomode laser beam thereby takes place in such a way that on the large-screen projection surface there respectively arises a first image with the rotated/unrotated direction of polarization on the respective first lines, and a second image with the unrotated/rotated direction of polarization on the respective second lines of the large-screen projection surface. The two images respectively produced thereby have the characteristic that they can be combined to form a three-dimensional overall image by an observer with a pair of glasses with a first glass for the one direction of polarization and with a second glass for the other direction of polarization.

Both methods thus enable an observer a three-dimensional view of a large-screen projection surface, by means of the principle of functioning of a laser projector.

In advantageous embodiments of the invention, are the subject given the use of two different directions of polarization rotated to one another by 90 degrees, a maximum cross-talk damping is given between the two images respectively shown with different directions of polarization.

If the partially transparent mirror comprises a transparency of 50%, the laser beam obtained after the partially transparent mirror and the deflected laser beam respectively have the same energy outputs. A further exploitation of the two partial laser beams is thereby particularly simple, since a matching of the two energy outputs to one another is omitted.

In order to produce the two images, the large-screen projection surface is scanned line by line. With the monomode laser principle, for the plotting of the respective first lines the laser beam from the one direction is used, and for the plotting of the respective second lines the laser beam from the other direction is used. If during the plotting of the respective one lines the laser beam for the plotting for the respective other lines is directed onto an absorption surface, an associated apparatus is not illuminated and heated on the inside. If the laser beam is directed onto a photovoltaic plate, to a certain extent energy can be recovered from the laser beam.

In the following, two embodiments of the invention are explained in more detail on the basis of drawing figures.

BRIEF DESCRIPTION OF THE DRAWINGS

FIG. 3 shows a rotating apparatus from FIG. 2, in a schematic view, for the rotation of the direction of polarization of the deflected partial laser beam.

DESCRIPTION OF THE PREFERRED EMBODIMENTS

Figure 1:
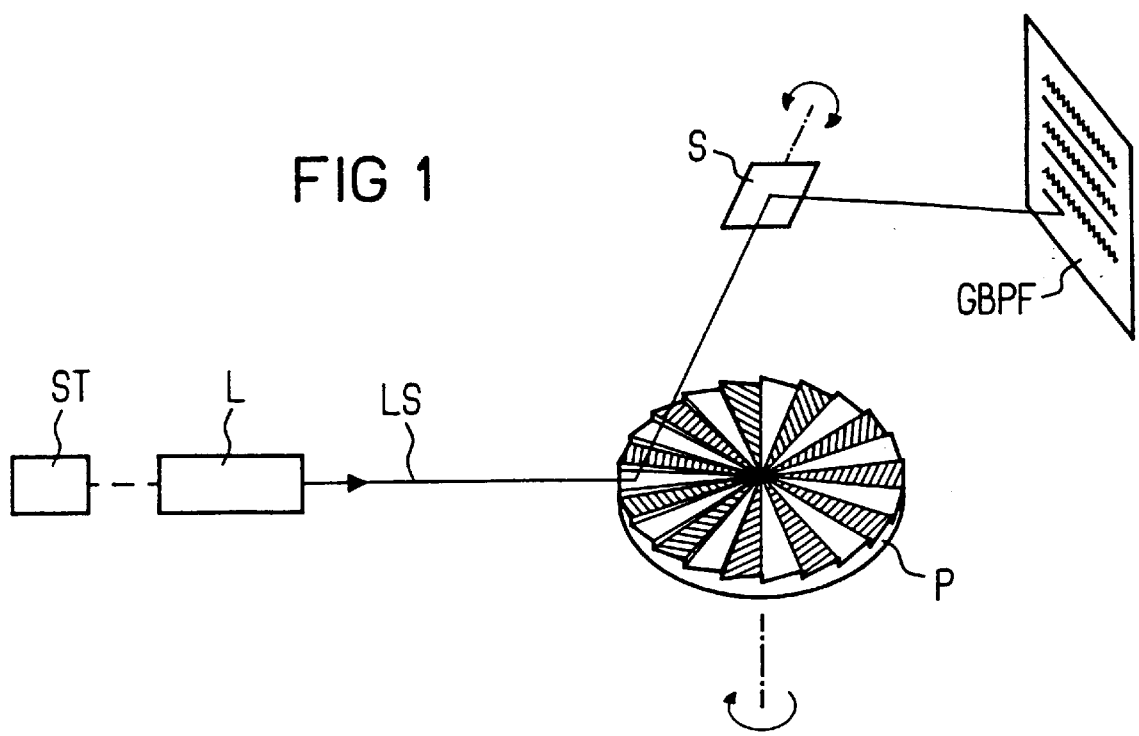
FIG. 1 shows a schematic drawing of a multimode laser projector of the invention.
Figure 2:
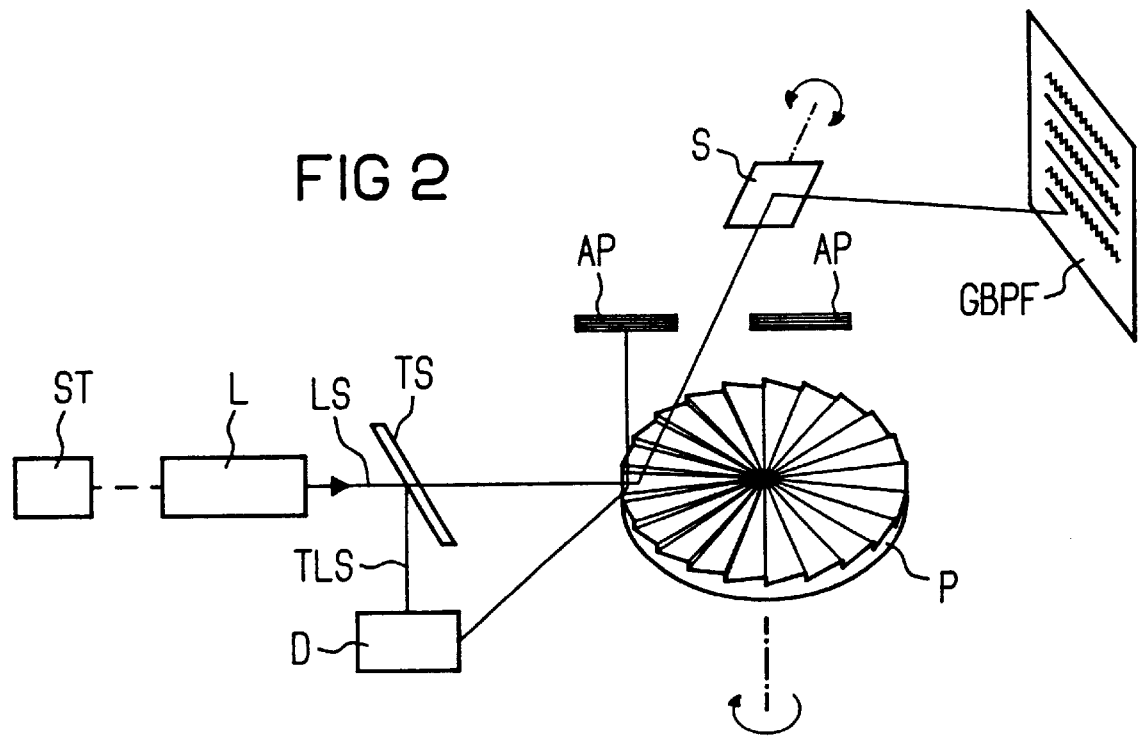
FIG. 2 shows a schematic drawing of a monomode laser projector of the invention.

FIGS. 1 and 2 respectively show only one laser L. In color projectors, lasers L are respectively provided for one of the colors red, green, and blue. However, each of these lasers L operates according to the principle shown, so that here only one laser L need respectively be shown.

FIGS. 1 and 2 show the basic parts of a laser projector necessary for understanding the invention. These are a laser L (already discussed) that emits a laser beam LS, a polygonal mirror P that is responsible for a horizontal laser beam deflection, a further mirror S that is responsible for a vertical laser beam deflection, and a control unit ST for controlling the laser beam LS emitted by the laser L.

The polygonal mirror P responsible for the horizontal deflection of the laser beam LS rotates about an axis. The rotation is indicated by a corresponding arrow about the relevant axis. In the embodiment, the additional mirror S pivots back and forth, likewise indicated by a corresponding arrow about the corresponding axis.

In FIG. 1, the laser L is a multimode laser, while in FIG. 2 the laser L is a monomode laser.

The basic principle of a laser projector is that the laser 10 beam LS produced by the laser L is cast onto the polygonal mirror P. The polygonal mirror P thereby is formed of a large number, e.g. 32, mirror parts, each responsible for a line of a large-screen projection surface GBPF. The mirror parts are arranged in sawtooth fashion, seen along the circumference. This is because the mirror parts are arranged in the manner of the blades of a propeller, and respectively have an angle of incidence. The laser beam LS respectively impinges a mirror part from the side. By means of the rotation of the polygonal mirror P and the respective obliquely positioned mirror part, the laser beam LS undergoes a linear beam motion in the deflected beam part, in addition to a beam deflection. By means of the diversion by the additional mirror S of the linearly moved beam part of the laser beam LS onto the large-screen projection surface GBPF, in this way a line of the large-screen projection surface GBPF can be described.

If, during a change to a next mirror part of the laser beam LS that impinges the polygonal mirror P, the additional mirror S is further rotated by a portion, the next mirror part can 30 describe a next line on the large-screen projection surface GBPF. After all mirror parts have been run through, the additional mirror S is reset, and the scanning of the large-screen projection surface GBPF can begin again from the start. Overall, in this way a two-dimensional image is represented.

For the representation of a three-dimensional image, according to FIG. 1 the laser beam LS is cast onto a polygonal mirror P whose mirror parts comprise layers that polarize light alternately in two directions of polarization. In FIG. 1, this is shown by alternating hatched and non-hatched surfaces. Since the laser beam LS is a multimode laser beam, it can be directed directly onto the polygonal mirror P. The directions of polarization that correspond to the directions of polarization of the polarizing layers of the mirror surfaces are respectively filtered out from the multimode laser beam by means of the polygonal mirror P.

A multimode laser comprising only these two directions of polarization is advantageously used from the beginning on, because in this way an optimal energy balance is achieved by means of the lowest energy losses.

By means of the coated polygonal mirror P, first lines of respectively successive first and second lines of the large-screen projection surface GBPF are respectively described with the one direction of polarization, and the respective second lines are described with the other direction of polarization. In FIG. 1, this is illustrated by thicker and thinner lines.

If, via the control unit ST a controlling of the laser beam LS takes place such that there respectively arises on the large-screen projection surface GBPF a first image with only the lines of the one direction of polarization and a second image with only the lines of the other direction of polarization, whereby images are to be produced such that the content of the images can be combined to form a meaningful three-dimensional overall image by an observer with a pair of glasses having a first glass for the one direction of polarization and a second glass for the other direction of polarization, then a three-dimensional image representation can be realized with the present laser projector.

If the laser L is a monomode laser, the principle according to FIG. 1 cannot be applied, because the laser beam LS is on the one hand forwarded by the differently polarizing coatings of the mirror parts of the polygonal mirror P, and on the other hand is however absorbed due to the non-matching direction of polarization between the laser beam TSL and the coating. In this case, according to FIG. 2 the laser beam LS is directed by a partially transparent mirror TS before being directed onto the polygonal mirror P. The polygonal mirror P thereby requires no light-polarizing layer. The mirror parts are simple mirrors.

The partially transparent mirror TS deflects a partial beam TSL. The partially transparent mirror advantageously has a transparency of 50%, so that the partial beam TSL and the laser beam still going through the partially transparent mirror TS respectively have an energy portion of 50%.

The partial beam TSL is directed into a rotating unit D. In the rotating unit D, the direction of polarization of the partial beam TSL is preferably rotated by 90 degrees. From the rotating unit D, the partial beam TSL is then directed onto the polygonal mirror P from a different direction than the unrotated laser beam after the partially transparent mirror TS. Given corresponding adjustments of the mirror parts—belonging to the rotated or, non-rotated laser beams—of the polygonal mirror P, it is thereby possible, in a corresponding manner as in FIG. 1, to describe first lines with the one direction of polarization and second lines with the other direction of polarization. Finally, two images with different directions of polarization can thereby again respectively be produced, which can be combined to form a three-dimensional image by an observer with a corresponding pair of glasses (already discussed above).

By means of the matching of the adjustments of the alternately set mirror parts of the polygonal mirror P to the directions from which the respectively associated laser beam is coming, there results the advantage that the respective other laser beam for the respective differently set mirror parts of the polygonal mirror P are directed away by the additional mirror S, so that it remains ineffective. Advantageously, this ineffective or, not currently needed laser beam is directed onto an absorption plate or photovoltaic plate AP.

FIG. 3 shows a possible construction of a rotating unit D. At the input side, the laser beam LS comes in with a direction of polarization PR1, and is directed onto a first mirror SP1. This mirror is, for example, set with x-y-z spatial coordinates −45°, −45°, 0°. The first mirror Sp1 rotates the direction of polarization PR1 into the direction of polarization PR2. The laser beam LS is directed to a second mirror SP2, which has for example the spatial coordinates 0°, 45°, −45°, by the first mirror SP1. The second mirror SP2 rotates the direction of polarization PR2 into the direction of polarization PR3. The laser beam LS is directed by the second mirror SP2 onto a third mirror SP3, which has for example the spatial coordinates −90°, a°, 0°. The third mirror SP3 rotates the direction of polarization PR3 into a direction of polarization PR4, which at the same time corresponds to the radiation direction of polarization PR5 with which the laser beam LS is directed onto the polygonal mirror P. The difference in the directions of polarization PR1 and PR5 is advantageously 90 degrees.

A large-screen projection surface GBPF is not to be understood exclusively as a relatively large surface. In particular cases it can also have small dimensions.

Although various minor changes and modifications might be proposed by those skilled in the art, it will be understood that our wish is to include within the claims of the patent warranted hereon all such changes and modifications as reasonably come within our contribution to the art.

What is claimed is:

1. A method for three-dimensional image representation on a large-screen projection surface by use of a functional principle of a laser projector comprising a rotating polygonal mirror for line deflection, and having at least one laser that emits a multimode laser beam, comprising the steps of:

directing the multimode laser beam from a side onto mirror parts of the polygonal mirror which respectively polarize light in first and second different directions in alternating fashion, are arranged in the manner of blades of a propeller, and respectively comprise an angle of incidence from which, corresponding to respectively alternating light-polarizing mirror parts set at an angle, lines are plotted on the large-screen projection surface with the first direction of polarization and with the second direction of polarization, in respective alternating fashion; and controlling the multimode laser beam such that on the large-screen projection surface a first image is respectively produced with only lines of the first direction of polarization and a second image is produced with only lines of the second direction of polarization, and the first and second images having respective characteristics such that they can be combined to form a three-dimensional overall image by an observer with a pair of glasses having a first glass for the first direction of polarization and having a second glass for the second direction of polarization.

2. The method according to claim 1, wherein the images respectively produced with the first and second different directions of polarization are produced with directions of polarization that differ by 90 degrees.

3. A method for three-dimensional image representation on a large-screen projection surface by use of a functional principle of a laser projector comprising a rotating polygonal mirror for line deflection, and having at least one laser that emits a monomode laser beam, comprising the steps of:

before impinging from a first direction onto respective associated first mirror parts of the polygonal mirror for a deflection onto respective first lines of respective successive first and second lines of the large-screen projection surface, directing the monomode laser beam by a partially transparent mirror for deflecting a partial beam, and rotating at least one of the deflected partial beam or the non-deflected monomode laser beam in its direction of polarization after the partially transparent mirror;

directing the deflected partial beam from a second direction onto respective associated second mirror parts of the polygonal mirror for a deflection onto the respective second lines of the respectively successive first and second lines of the large-screen projection surface;

controlling the monomode laser beam such that on the large-screen projection surface there is respectively produced a first image with the respective rotated or non-rotated direction of polarization on the respective first lines and a second image with the respective non-rotated or rotated direction of polarization on the respective second lines of the large-screen projection surface, the first and second images having respective characteristics that they can be combined to form a three-dimensional overall image by an observer with a pair of glasses having a first glass for the one direction of polarization and having a second glass for the other direction of polarization.

4. The method according to claim 3 wherein the monomode laser beam is directed by a partially transparent mirror with a 50% transparency.

5. A method according to claim 3, wherein the rotation of the laser beam is executed by mirroring by 90 degrees.

6. The method according to claim 3 wherein the laser beam not belonging to respective mirror parts of the polygonal mirror is directed onto an absorption surface or photovoltaic plate.

* * * * *